P. L. HOWLETT.
Alcohol Still.

No. 37,167.

Patented Dec. 16, 1862.

WITNESSES:

INVENTOR:

United States Patent Office.

P. L. HOWLETT, OF SPRINGFIELD, ILLINOIS.

IMPROVED APPARATUS FOR DISTILLING ALCOHOL, &c.

Specification forming part of Letters Patent No. 37,167, dated December 16, 1862.

*To all whom it may concern:*

Be it known that I, P. L. HOWLETT, of Springfield, in the county of Sangamon and State of Illinois, have invented a new and Improved Apparatus for Distilling Alcohol, &c.; and I do hereby declare that the following is a full, clear, and exact description of the same, reference being had to the accompanying drawings, forming a part of this specification, in which—

Figure 1:
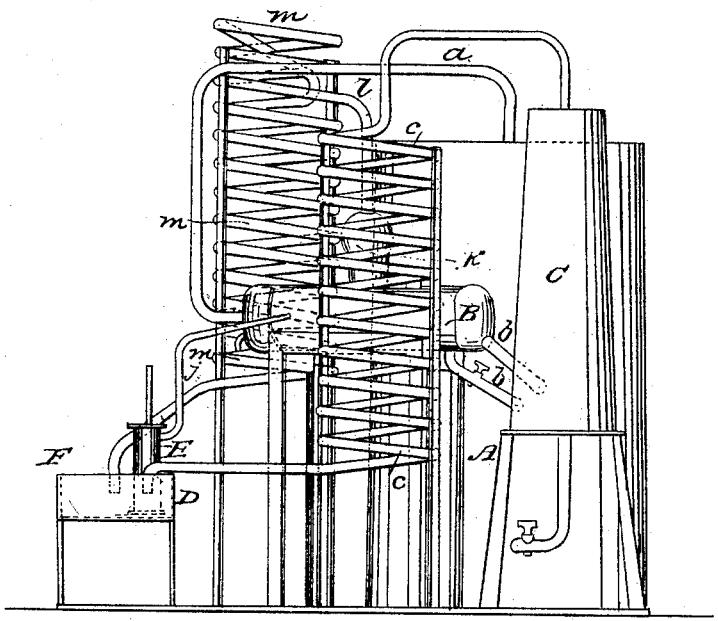
Figure 2:
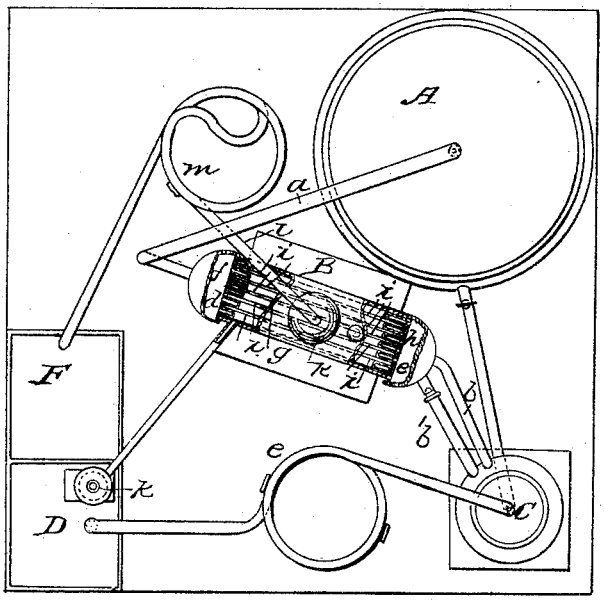

Figure 1 represents a front elevation of my invention. Fig. 2 is a plan or top view of the same, partly in section.

Similar letters of reference in both views indicate corresponding parts.

This invention relates to an improvement in that class of apparatus which is generally used for the purpose of extracting alcohol from beer.

The invention consists in the arrangement of an extractor with one or more heating-tubes, in combination with the ordinary still and doubler, in such a manner that the steam emanating from the still in passing through the tube or tubes of said extractor is capable of heating and vaporizing the first wine, which on leaving the doubler is returned to the extractor by dry heat and without imparting to it any more water than it already contains, and that by these means the first wine is redistilled and converted into alcohol without requiring any further distillation and without any additional expenditure of fuel.

It consists, further, in the arrangement of a cylindrical vessel with three compartments and provided with heating-tubes, in combination with a still, a doubler, two condensing-coils, two reservoirs, and a pump, in such a manner that the first wine can conveniently and readily be returned to the middle compartment of the cylindrical vessel or extractor, where it is vaporized by the action of the steam passing through the heating-tubes, and converted into alcohol without an additional expenditure of fuel or steam.

To enable others skilled in the art to make and use my invention, I will proceed to describe its construction and operation with reference to the drawings.

A represents a still constructed of wood or any other suitable material in the ordinary manner, and divided by two horizontal partitions in three compartments, which contain beer of gradually-increasing strength, and the lowest of which receives steam from a generator. The steam in passing through the beer takes up the strength or spirit contained in the same, and on leaving the still it is conducted by a pipe, $a$, to the extractor B, thence by a pipe, $b$, to the doubler C, from which it is discharged through a worm, $c$, into a trough, D. The extractor B consists of a cylindrical vessel, of copper or any other suitable material, placed in a horizontal position, which is divided by two vertical partitions, $d\ e$, in three compartments, $f\ g\ h$. The compartments $f$ and $h$ communicate with each other through one or more tubes, $i$, which extend through the middle compartment, $g$, as clearly shown in Fig. 2 of the drawings. The pipe $a$ from the still leads to the compartment $f$, and the pipe $b$, which forms the communication between the extractor and the doubler, emanates from the compartment $h$, so that the steam from the still has to pass through the tubes $i$ in the extractor in order to reach the doubler. In passing through the doubler the strength of the steam is doubled in the ordinary manner, so that the liquor discharged from the worm $c$ into the trough D is of the same strength, or nearly so, as ordinary high-wine. This wine, which forms the product of the first distillation, is returned to the extractor B by means of a pump, E, through a pipe, $j$, which communicates with the middle compartment, $g$, of the extractor. The steam from the still, in passing through the pipes $i$ on its way from the compartment $f$ to the compartment $h$, heats the first wine contained in the compartment $g$ to such a temperature that its more volatile parts form into steam. The less volatile parts of said first wine are returned from the compartment $g$ by means of a pipe, $b'$, to the doubler C, and the steam collects in the steam-dome $k$, from which it is conducted through the pipe $l$ to the condensing-worm $m$, which discharges the condensed liquor or alcohol into the trough or receiver F. During this operation the steam from the still is not permitted to come in direct contact or to mingle with the first wine contained in the compartment $g$ of the extractor, and this, therefore, receives the full benefit of the second distillation. The upper coils of the worm $m$ are ascending, so that the watery and oily particles which are or may be carried up by the steam from the liquor contained in the compartment $g$ are condensed and returned to the extractor in the liquid state. By the condensed liquid thus returned the temperature of the liquor in the extractor is reduced; and it is obvious that the reduction in temperature thus effected will increase with the number and size of ascending coils, so that the strength of the alcohol discharged from the worm $m$, which depends in a great measure upon the temperature at which the distillation takes place, can be regulated by increasing or decreasing the number of ascending coils or the diameter of the pipe composing said coils.

By the use of the extractor B the operation of distilling can be continued without interruption, and the purity and strength of the liquor are considerably increased without any additional expenditure of fuel or steam simply by using the heat of the steam or vapor emanating from the still for the purpose of boiling or evaporating the first wine in the extractor.

Having thus fully described my invention, what I claim as new, and desire to secure by Letters Patent, is—

1. The arrangement of one or more heating-tubes, $i$, in the extractor B, in combination with the still A and doubler C, constructed and operating substantially as and for the purpose specified.

2. The arrangement and combination of three compartments, $f\ g\ h$, in the extractor B, pipes $a$ and $b$, heating-tubes $i$, still A, doubler C, worms $c$ and $m$, troughs D and F, and pump E, all constructed and operating as and for the purposes shown and described.

P. L. HOWLETT.

Witnesses:
J. F. BUCKLEY,
W. HAUFF.